United States Patent
Waycott et al.

(10) Patent No.: US 9,942,314 B2
(45) Date of Patent: Apr. 10, 2018

(54) SYSTEM AND METHOD FOR OPTIMIZING WEB SERVICE AVAILABILITY WITH A NODE GROUP AGREEMENT PROTOCOL

(71) Applicant: Apriva, LLC, Scottsdale, AZ (US)

(72) Inventors: John D. Waycott, Phoenix, AZ (US); Steven Strublic, Peoria, AZ (US); James H. Morris, II, Cave Creek, AZ (US); Robert C. Smith, Phoenix, AZ (US); William Swortwood, Queen Creek, AZ (US)

(73) Assignee: Apriva, LLC, Scottsdale, AZ (US)

( * ) Notice: Subject to any disclaimer, the term of this patent is extended or adjusted under 35 U.S.C. 154(b) by 449 days.

(21) Appl. No.: 14/573,777

(22) Filed: Dec. 17, 2014

(65) Prior Publication Data
US 2016/0182623 A1 Jun. 23, 2016

(51) Int. Cl.
*H04L 29/08* (2006.01)

(52) U.S. Cl.
CPC .......... *H04L 67/1031* (2013.01); *H04L 67/02* (2013.01); *H04L 67/1029* (2013.01); *H04L 67/1034* (2013.01); *H04L 67/16* (2013.01)

(58) Field of Classification Search
CPC ... G06F 2209/505; G06F 9/5061; H04L 67/16
See application file for complete search history.

(56) References Cited

U.S. PATENT DOCUMENTS

| | | | | |
|---|---|---|---|---|
| 5,446,896 A | * | 8/1995 | Hegarty | G06F 9/54 |
| 7,958,385 B1 | * | 6/2011 | Frangioso | G06F 11/2025 709/223 |
| 8,160,073 B2 | * | 4/2012 | Meuninck | H04L 12/2834 370/351 |
| 8,826,032 B1 | * | 9/2014 | Yahalom | H04L 43/0817 713/187 |
| 2003/0074402 A1 | * | 4/2003 | Stringer-Calvert | G06F 9/5061 709/203 |
| 2006/0004874 A1 | * | 1/2006 | Hutcheson | A63F 13/34 |
| 2006/0155802 A1 | * | 7/2006 | He | H04L 29/06 709/203 |
| 2008/0005291 A1 | * | 1/2008 | Bae | G06F 9/5061 709/223 |
| 2008/0177741 A1 | * | 7/2008 | Joshi | G06F 17/30557 |
| 2010/0100938 A1 | * | 4/2010 | Ramic | H04L 63/102 726/4 |
| 2015/0095536 A1 | * | 4/2015 | Lee | G06F 13/362 710/110 |

* cited by examiner

*Primary Examiner* — Shean Tokuta
(74) *Attorney, Agent, or Firm* — Law Offices of David O. Caplan, PLLC

(57) ABSTRACT

In a computer system having multiple servers, services are coordinated among nodes as a result of each node tracking the node state of each other node (such as the services it currently performs) and performing coordinator functions (such as controlling which servers provide which services) only if it determines itself to be a coordinator node and only if all nodes are in agreement as to the node state of every node. Each node communicates, to each of the other nodes, its node state, a coordinator node identifier indicating which node it has determined to be the coordinator node, and a global state of all nodes it determines based on the node states and coordinator nodes of all the nodes. A node performs coordinator functions only if it is a coordinator node and only if all nodes have the same global state.

12 Claims, 5 Drawing Sheets

SYSTEM AND METHOD FOR OPTIMIZING WEB SERVICE AVAILABILITY WITH A NODE GROUP AGREEMENT PROTOCOL

FIELD OF THE INVENTION

The present invention relates to the management of software services provided by multiple servers.

BACKGROUND

The concept of client/server architecture was once employed as a response to the high cost of computer microprocessors and memory that defined an earlier age of computing. In that setting, client/server architecture allowed multiple users of minimally configured computer terminals to share and utilize a more powerful mainframe computer without the cost of equipping each terminal with a more expensive computer system. In this fashion, an organization could invest in a small number of richly configured computer servers which were then made available to a potentially much larger number of minimally configured terminals that could send computing requests to the servers over a network. Such requests might include, for example, a data retrieval function that searches a database for requested subject matter. The server would receive the request, process it to format a database query, execute the query, receive the results, format the results, and send them across the network to the requesting terminal.

As processing and memory costs dropped dramatically, minimally configured terminals were gradually replaced by powerful desktop computers that were capable of performing more advanced functions on their own, and the original need for client/server computing largely diminished. The proliferation of the Internet, however, brought client/server computing back in a very large way in the case of web services. Web services allow developers to create applications and application functions that can be utilized by Internet clients in order to receive benefit from more common computing needs while reducing wasted effort by increasing reuse. With web services, any type of computing device that has an ability to access the Internet can connect to a "cloud" and run applications that would otherwise be beyond the ability of the device to process efficiently, if at all. With applications and connecting clients numbering in the tens of millions, however, the popular utilization of web services can exceed the ability of server computers to provide them. This can significantly impair operation of the network, cloud and/or web services themselves, including impaired data flow, increased connection traffic, the formation of bottlenecks and other inefficiencies. Accordingly, there is a need for improved methods and means for managing server resources so that web services may be provided more efficiently.

SUMMARY OF THE INVENTION

The present invention provides for more efficient utilization of processing functions in software services, such as for the provision of web services over the Internet, by providing a protocol by which multiple processor nodes of correspondingly multiple servers operate to share services efficiently and without conflict. In accordance with this protocol, nodes communicate among each other and utilize the information received to harmoniously control the servers. As a result, the nodes can, for example, collectively move service requests to nodes with greater capacity and/or less workload.

In a group of nodes, one node is designated as the coordinator node and performs coordinator functions such as directing all active nodes as to which services they will provide. The protocol allows the node group to develop consensus regarding the state of each of the nodes, such as what services each node is running and what node appears to each node to be the coordinator node, and allows the coordinator node to perform coordinator functions only at times when such consensus exists. This ensures that only one node in the group can direct the node group at a given time, and that it will do so based on correct and consistent information. As a result, changes can occur to the combination of servers providing the services without significantly interfering with their ability to provide services to their clients.

In an embodiment of the invention, the above protocol is implemented by an algorithm that is performed by each node in the group. In accordance with this algorithm, each node periodically announces (such as by multicast or broadcast) its own current state information to the group, receives such announcements from each of the other active nodes, and maintains the most recently known state information of all active nodes in the group. This state information of a given node includes a node state which represents the services the given node is currently running, a coordinator node identifier indicating what appears to the given node to currently be the coordinator node (based on a same prioritization method applied by all nodes in the group) and a global state value determined by the given node based on the most recently known node state and coordinator information of all active nodes. When the global state values are found to be identical, the coordinator node may direct all the nodes in the group, such as by assigning or un-assigning services to be performed by any node. This ensures that if a coordinator node ceases to function, a new node joins the group or a previously nonfunctioning node begins to function again, a new coordinator node can be quickly and seamlessly selected by the node group.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout the Figures, and:

Figure 3:
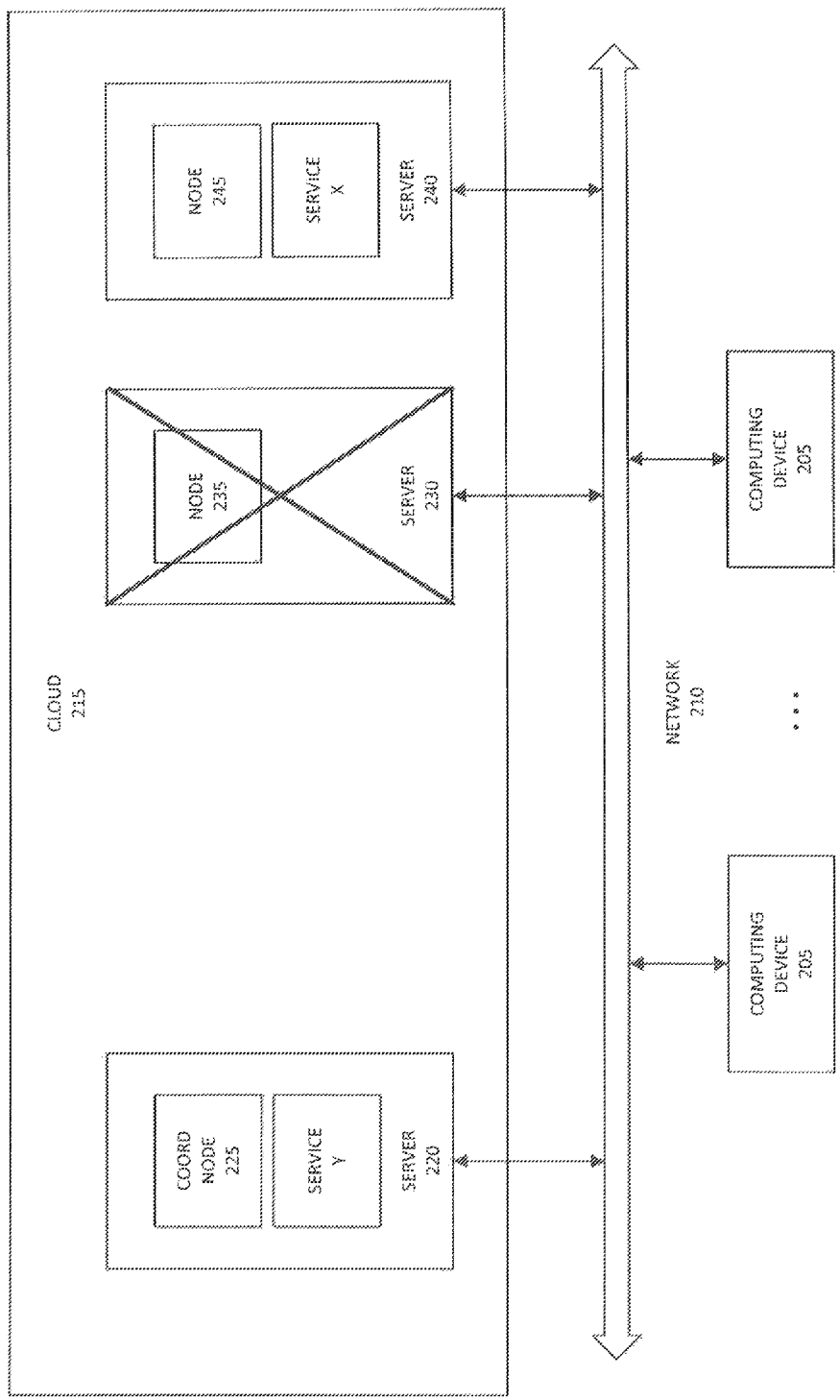
Figure 4:
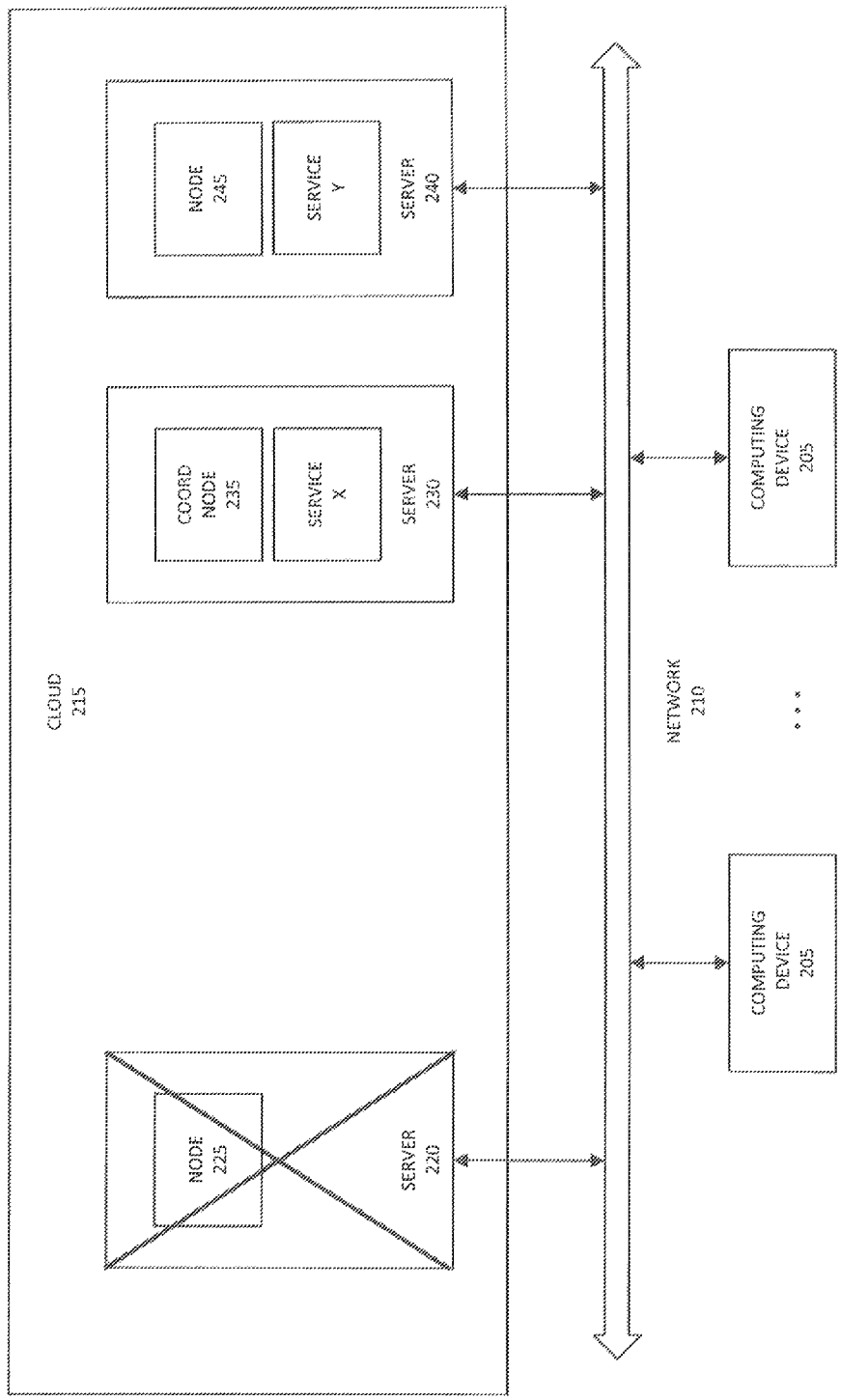
Figure 5:
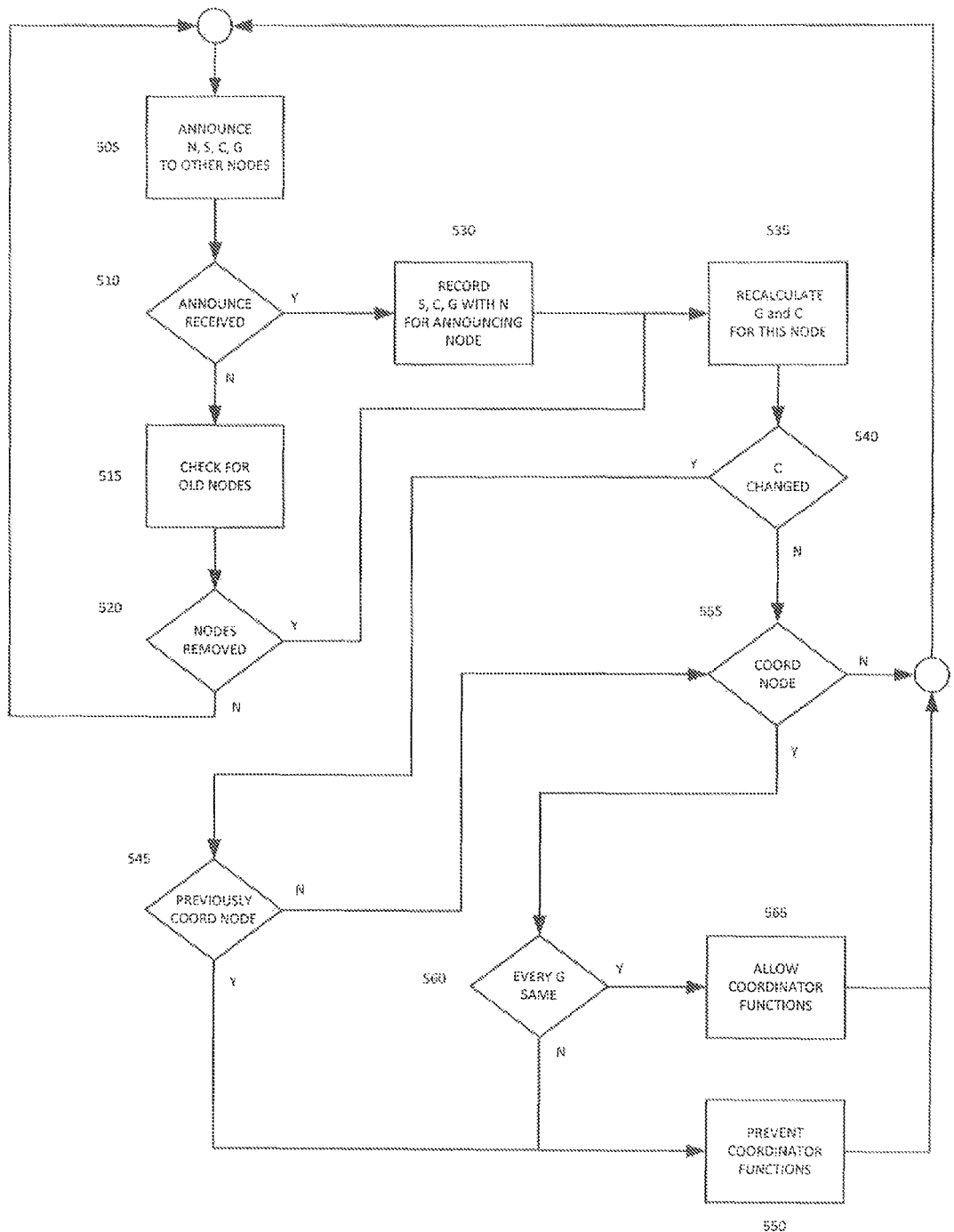

FIG. 3 a system diagram showing an example of the client/server environment after a server fails or otherwise becomes unavailable;

FIG. 4 is a system diagram showing the client/server environment after a server containing a coordinator node fails or otherwise becomes unavailable;

FIG. 5 is a flowchart of logical steps performed by a node in accordance with an embodiment of the invention.

DETAILED DESCRIPTION OF EXEMPLARY EMBODIMENTS

Figure 1:
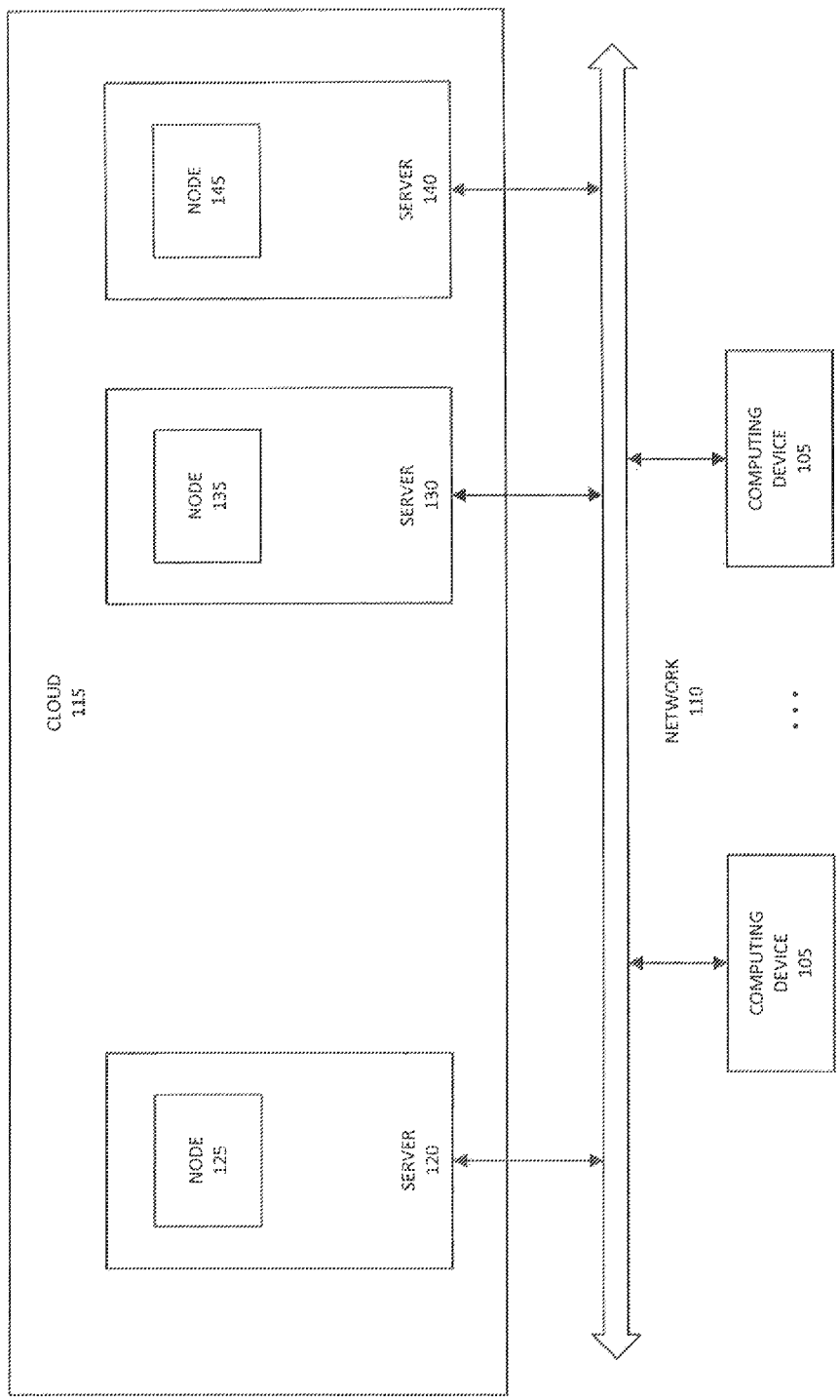
FIG. 1 is a system diagram of a client/server environment in which the invention may be employed in accordance with one potential embodiment.

In an embodiment of the invention, a Multicast Group Agreement Protocol (MGAP) is implemented by an algorithm performed by each node in a node group. FIG. 1 is a system diagram of a client/server environment in which the MGAP algorithm may be employed. As shown in FIG. 1, any number of computing devices 105 may be connected over a network 110 to multiple servers within a cloud 115. Each server contains a node which comprises essential processing elements such as a microprocessor and is capable of bidirectional communication with the other nodes in the node group contained by each of the other servers shown. Specifically, in the exemplary system shown in FIG. 1, server 120 contains node 125, server 130 contains node 135, and server 140 contains node 145.

Figure 2:
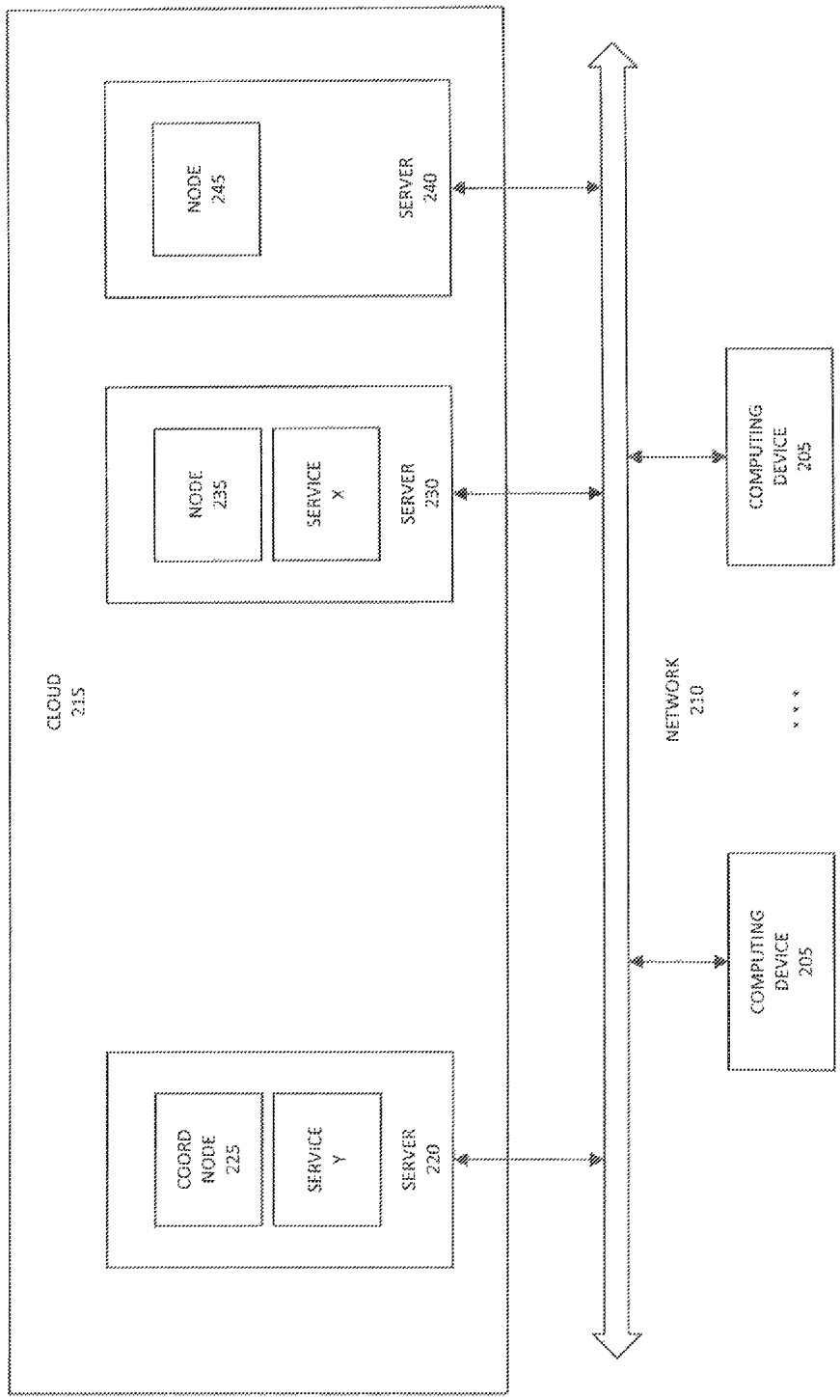
FIG. 2 is a system diagram showing an example of the client/server environment in a fully functional state.

FIGS. 2-4 show a system with a same overall configuration as the system shown in FIG. 1, but containing more specific information, with each Figure corresponding to a different state of operation depending on various circumstances, such as which servers are functional, and which servers are hosting which services. FIGS. 2-4 will be referred to again after the function of each node is more specifically described below. Although three servers are shown in FIGS. 1-4 for purposes of explanation, it should be understood that the cloud 115 could contain any number of servers and the MGAP algorithm can be employed in and by any number of servers as appropriate for the objectives and needs at hand.

In order to provide requested services to computing devices 105 in an effective manner, the resulting workload may be shared by some combination of servers within the cloud. Specifically, the processing load required to perform the functions necessary to provide these services may be distributed among some combination of available nodes in a node group. In order to manage the processing load without conflict, one of the nodes in the node group functions as a coordinator node to coordinate and control the distribution of services among the available nodes. A coordinator node, may, for example, assign a new service to a server or move an existing service to a different server. This responsibility may be handled by different nodes in a node group depending on the circumstances, such as which servers are operational at the time. However, in order to operate reliably and without conflicts, the coordinator responsibility must be handled by only a single node at any given time. The MGAP accomplishes this by ensuring that coordinator functions are performed only at times when all nodes are in agreement as to which node is the coordinator node.

In accordance with the MGAP algorithm, state information of all nodes is continually maintained and updated by each node in the node group. The state information of any one such node (referred to below as the "subject" node) includes a node identifier (N) which uniquely identifies the subject node among all other nodes in the node group. The node identifier is, for example, an integer value which corresponds to the subject node's priority among the node group in determining which node is selected as a node coordinator at any given time, with the lowest number indicating the highest priority.

The state information of the subject node also includes a coordinator node identifier (C) which identifies the node that currently appears, to the subject node, to be the coordinator node for the group. The coordinator node identifier is, for example, an integer value as described above, determined by the subject node to be the lowest value among the node identifiers of all nodes in the node group.

The state information of a subject node also includes a node state (S) which includes a list of the services it is currently running, as well as potentially additional information that could be of value to a coordinator node in managing the node group. The coordinator node may, as appropriate, refer to the node states of the nodes in the node group in order to manage the distribution of workload among different servers.

The state information of a subject node also includes a global state (G) which is based on the node state and coordinator information of all the nodes in the node group as it currently appears to the subject node. As each of the other nodes maintains an N, C and S of its own and periodically announces its state information to the other nodes, the subject node is able to maintain a record of all active nodes (those that continue to announce) and maintain the most recently received C and S in association with the N of each active node. Based on this information, the subject node computes and maintains the global state G which is, for example, a computed hash of S and C for all nodes in the node group that appear to the subject node to be operational. As will be further explained, the global state G is used to ensure that all nodes in the node group are in agreement as to the state information of the entire group, including which node is the coordinator node. When all nodes have the same global state G, the group can be said to be in a "converged" state and the coordinator node may direct the operation of other nodes in the group without risk of conflict.

At any given point of operation during which the system is in a converged state, a coordinator node may perform any appropriate coordinator function. Coordinator functions may vary and will be readily implemented by one skilled in the art as appropriate to the needs and implementation at hand. It will be understood, however, that such functions may include assigning a new service to a node, assigning a service to a new node in the node group or a newly activated or reactivated node, removing a completed service from a node, or moving an existing service to another node, depending on circumstances such as the distribution of workload among the nodes in the node group.

During operation, a node may become active or become inactive, such as may result from changes to the operability of an existing server, or from a new server being introduced or an existing server being removed. As such changes may impact which node can or should function as the coordinator node and lead to conflicts if more than one node attempts to perform coordinator functions at the same time, it is important that they be recognized by the system quickly and that coordinator functions not continue to occur until all nodes in the system are in agreement as to which nodes is the coordinator node and which services all nodes are running. The present invention accomplishes this objective by communicating and managing the state information described above and only allowing coordinator functions to be performed when all nodes are in consensus as to the global state of the entire node group. This process is implemented by the collective result of each node in the node group performing the MGAP algorithm, which is described in more detail below.

FIG. 5 is a flowchart representing a logical process performed by any one node in the node group (herein referred to as a "subject node") to implement the MGAP algorithm. The process shown in FIG. 5 represents the functions performed by the subject node in response to changes made by the coordinator node to services performed by any of the nodes, changes to the nodes in the active node group, or changes that occur as a result of these things. Generally speaking, as long the subject node is operational, the main process shown in FIG. 5 is repeated on a continual basis. Although steps are shown in a particular order, one of ordinary skill in the art will appreciate that different combinations of steps may be performed in a different order and/or in different ways, as long as appropriate within the context of the invention as described herein.

In accordance with the MGAP algorithm, each node in the node group, including the subject node, periodically announces its state information and continually listens for similar announcements from the nodes in the node group, continually updates a list of this information for each node in the node group. Although FIG. 5 shows announcement steps such as 505 and listening steps such as 510 as part of a sequential flow, it should be understood that these aspects of the process may be implemented as independently event-driven functions. Also, although announcements among nodes are sometimes described herein as being multicast communications, it should be understood that a broadcast scheme or any other appropriate means of communication may be employed.

In step 505, if a sufficient predetermined time period has been surpassed since the last announcement was sent by the subject node, the subject node announces its node identifier N, node state S, coordinator node identifier C and global state G to the other nodes in the node group. In alternative embodiments, N might be determined from other information such a source address of the announcing node rather than being announced.

In step 510, the node listens for announcements from other nodes and proceeds accordingly. If it is determined in step 510 that the subject node has not received such an announcement from any nodes, it checks in step 515 to see if a predetermined period of time has been surpassed since an announcement was obtained from each node and, if so, removes each such "old node" from the record of active nodes. If it is then determined in step 520 that no nodes were removed from the record, the process returns to step 505. If it is determined in step 520 that any nodes were removed, the subject node proceeds to step 535, which will be explained below.

If it is determined in step 510 that the subject node has received an announcement, the subject node then records, in step 530, the S, C and G in association with the node identifier N of the announcing node. If the node from which the announcement was received is currently listed as an active node, any changes to S, C or G will be reflected as a result. If the node from which the announcement is received is not currently listed as an active node, it will be added to the record of active nodes S, C and G will be recorded in association with N for the newly active node. The process then proceeds to step 535.

In step 535, the subject node recalculates its global state G and coordinator node identifier C. An announcement received may have changed the information for the announcing node when it was newly recorded in step 530, which will affect the aggregate information that determines global state G. Also, if the other node was not previously listed on the record of active nodes, the coordinator node C may be affected as well. Alternatively, where an announcement was not received, the coordinator node C may be affected if any nodes were removed from the record. Accordingly the subject node recalculates G based on the most current information for only the nodes now recorded as the active nodes in the node group, and recalculates C in case it is affected by the change. The global state G is calculated, for example, as a computed hash of S and C for all nodes in the node group that are recorded as active nodes. The coordinator node identifier C is determined, for example, to be the node identifier having the lowest value among the node identifiers of all nodes in the newly altered node group based on the most recent information of the subject node. In such case, if a newly added node has a lower value than the node currently identified as the coordinator node, the coordinator node may be changed.

In step 540, the subject node determines whether its coordinator node C has been changed. If the subject node determines in step 540 that its coordinator node C has been changed, it then determines in step 545 whether it was previously the coordinator node before the change by comparing the current C to a previous C that has been stored. If so, the subject node will proceed to step 550 and stop performing coordinator node functions, and will then return to step 505 to repeat the process described herein. If the subject node does not determine in step 545 that it was previously the coordinator node, it will proceed to step 555, which is described below.

Returning to step 540, if the subject node determines that its coordinator node C has not been changed, it will determine in step 555 whether it is the coordinator node. If not, the subject node will return to step 505 and repeat the process described herein. If the subject node determines in step 555 that it is the coordinator node, it will determine in 560 whether the global state G for every node is the same. If so, the system is converged and the subject node will be allowed in step 565 to perform coordinator functions as described above. Such functions may include, for example, directing any node in the node group to perform any designated service. If the subject node determines in step 560 that the global state G is not the same for every node, then the system is not converged and it will be prevented from performing coordinator functions in step 550.

Examples of the MGAP algorithm, working in conjunction with coordinator functions performed by the coordinator node, will now be provided with reference to FIGS. 2-4. In discussing the examples below, a step that is performed by multiple nodes may be discussed in a single reference for the sake of brevity and clarity. It will be understood that any such step will occur at a time and sequence dictated by the node performing it and may not be at the same time it is performed by another node. FIGS. 2-4 generally correspond to the client/server environment shown in FIG. 1 but additionally show specific services being performed by the servers, as well as potential changes in operability of the servers so as to illustrate the ability of the MGAP algorithm to ensure that such services remain active, even when a server becomes unavailable, without resulting in conflicts among the nodes. FIGS. 2-4 also show which node is the coordinator node at a given time. As an initial point of reference, FIG. 2 shows the system first in a fully functional state where all servers are operable and node 225 is initially directing server 230 to run service X and directing its own server 220 to run service Y.

FIG. 3 shows the system of FIG. 2 after adapting to circumstances where server 230 fails or otherwise becomes unavailable. As a result of server 230 becoming unavailable, node 225 and node 245 will no longer receive announcements from node 235. Upon determining that a predetermined period of time has been exceeded since an announcement was obtained from node 235, nodes 225 and 245 will each remove (in step 515) node 235 from its record and, as a result of being determined (in step 520) to have removed a node, will recalculate (in step 535) its G and C. In this case, C will be determined (in step 540) not to have changed, as the node with the highest priority, node 225, is still operational.

When node 245 reaches this point and then determines (in step 555) that it is not the coordinator node, it will return to step 505. When node 225 reaches the same point and then determines (in step 555) that it is the coordinator node, it will proceed to determine (in step 560) whether the global state G is the same for every node in the node group. This will not be the case until node 225 has, as a result of receiving announcements from all nodes with updated state information, updated G for all nodes to reflect the most recent global state. Thus, the node group will de-converge and node 225 will stop performing coordinator functions (in step 550) and return to step 505, and continue to do so each time it traverses step 560 in the process of performing the algorithm, until G is again the same for all nodes. At that point, when node 225 next reaches step 560, the node group will be re-converged and node 225 will proceed to step 565 and begin coordinator functions again.

Once again functioning as a coordinator node, node 225 will recognize that service X is no longer available from any of the active nodes and, in this example, newly assign service X to node 245 running on available server 240. This will cause node 245 to change its node state S and the new S will be reflected in the next announcement that node 245 sends thereafter to the node group, upon which each node will record (in step 530) the new state information and recalculate G and C (in step 535) which will result in a new G based on the change and, as each node determines (in step 540) that C has not changed, it will proceed to determine (in step 555) whether it is the coordinator node.

When node 245 reaches this point and then determines (in step 555) that it is not the coordinator node, it will return to step 505. When node 225 reaches the same point and then determines (in step 555) that it is the coordinator node, it will then determine (in step 560) whether the global state G is the same for every node in the node group. As this will not be the case until node 225 has updated G for all nodes, it will stop performing coordinator functions until it is determined that G is again the same for all nodes, at which point the system will again be converged and node 225 will start (in step 565) performing coordinator functions again.

FIG. 4 shows, alternatively to FIG. 3, the system of FIG. 2 after adapting to circumstances where server 220 fails or otherwise becomes unavailable. As a result of server 220 becoming unavailable, node 235 and node 245 no longer receive announcements from node 225. Upon determining that a predetermined period of time has been exceeded since an announcement was obtained from node 225, nodes 235 and 245 will each remove (in step 515) node 225 from its record and, as a result of being determined (in step 520) to have removed a node, will recalculate (in step 535) its G and C. In this case, C will change, because the node that had the highest priority, node 225, is no longer operational. In this example, node 235 is presumed to have the highest priority among nodes that remain operational, and C is recalculated to be the node identifier N of node 235. When each node determines (in step 540) that C has changed, it will then determine (in step 545) whether it was previously the coordinator node. If node 225 is able to perform the MGAP algorithm at this time, it will determine that it was previously the coordinator node and will (in step 550) stop performing coordinator functions. Nodes 235 and 245 would each determine (in step 545) that it was not previously the coordinator node and, as a result, proceed to step 555. Node 245 will determine (in step 555) that it is not the coordinator node and will return to step 505. Node 235, however, will determine (in step 555) that it is the coordinator node and, as a result, proceed to determine (in step 560) whether every G is the same. As this will not be the case at first, the node group will de-converge as node 235 will not perform coordinator functions in step 550 and will not re-converge until G is the same for all nodes, at which point node 235 will start coordinator functions and the system will be re-converged.

Now functioning as a coordinator node, node 235 will recognize that service Y is no longer available from any of the active nodes and, in this example, newly assign service Y to node 245 running on available server 240. This will cause node 245 to change its node state S and the new S will be reflected in the next announcement that node 245 sends thereafter to the node group, upon which each node will record (in step 530) the new state information and recalculate G and C (in step 535) which will result in a new G based on the change and, as each node determines (in step 540) that C has not changed, it will proceed to determine (in step 555) whether it is the coordinator node.

When node 245 reaches this point and then determines (in step 555) that it is not the coordinator node, it will return to step 505. When node 235 reaches the same point and then determines (in step 555) that it is the coordinator node, it will then determine (in step 560) whether the global state G is the same for every node in the node group. As this will not be the case until node 235 has updated G for all nodes, it will stop performing coordinator functions until it is determined that G is again the same for all nodes, at which point the system will again be converged and node 235 will start (in step 565) performing coordinator functions again.

In an embodiment of the invention, the MGAP algorithm may also support authentication of nodes using, for example, a shared secret. In one possible implementation, an initial coordinator node creates a group token and a group key is derived from the group token and shared secret values. The group key is used to create a message authentication code. A node may join the node group by sending a join request with credentials based on the shared secret. A current coordinator node authenticates the join request and sends a join accept message containing the group token and authentication based on the group key. When the node receives the join accept message, it authenticates the coordinator node and derives the group key. Thereafter, it can multicast announcement messages, with nodes ignoring any messages having invalid message authentication codes.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

It should be appreciated that the particular implementations shown and described herein are illustrative of the invention and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction card distribution system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a tangible computer-readable storage medium having computer-readable program code means embodied in the storage medium. Any suitable tangible computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method for coordinating services provided by multiple nodes in a node group,
the method performed by a first node in the node group and comprising the steps of:
generating a first node state representing services currently performed by the first node;
providing the first node state to each other node in the node group;
obtaining, from each other node in the node group, a corresponding other node state representing services currently performed by the corresponding other node;
generating a first global state based on the first node state and each other node state obtained;
obtaining, from each other node in the node group, a corresponding other global state generated by the corresponding other node;
comparing the first global state and each other global state; and
performing coordinator node functions only when the first global state and each other global state are all the same, the coordinator node functions comprising at least one of directing a node in the node group to perform a service and directing a node in the node group not to perform a service;

maintaining a first coordinator node identifier, the first coordinator node identifier representing a node in the node group determined by the first node to be a coordinator node;
wherein the step of performing coordinator node functions comprises performing coordinator node functions only when the first global state and each other global state are the same and only when the first coordinator node identifier identifies the first node;
obtaining, from each other node in the node group, a corresponding other coordinator node identifier representing a node in the node group determined by the corresponding other node to be the coordinator node; and
wherein the step of generating the first global state comprises generating the first global state based on the first node state, each other node state obtained, the first coordinator node identifier, and each other coordinator node identifier obtained.

2. The method of claim 1 wherein the step of generating the first global state comprises generating a computed hash of the first node state, each other node state, the first coordinator node identifier, and each other coordinator node identifier.

3. The method of claim 1, further comprising the steps of:
maintaining a record of all active nodes in the node group; and
periodically determining whether a communication has been received from each other node in the node group and removing from the record any node from which no communication has been received after a predetermined amount of time.

4. A computer system for coordinating services provided by multiple nodes in a node group, the system comprising:
a server having a first node in the node group, the first node comprising
means for maintaining a record of all active nodes in the node group;
means for generating a first node state representing services currently performed by the first node;
means for providing the first node state to each other node in the node group;
means for obtaining, from each other node in the node group, a corresponding other node state representing services currently performed by the corresponding other node;
means for generating a first global state based on the first node state and each other node state obtained;
means for obtaining, from each other node in the node group, a corresponding other global state generated by the corresponding other node;
means for comparing the first global state and each other global state; and
means for performing coordinator node functions only when the first global state and each other global state are all the same, the coordinator node functions comprising at least one of directing a node in the node group to perform a service, and directing a node in the node group not to perform a service;
means for maintaining a first coordinator node identifier, the first coordinator node identifier representing a node in the node group determined by the first node to be a coordinator node:
wherein the means for performing coordinator node functions comprises means for performing coordinator node functions only when the first global state and each other global state are the same and only when the first coordinator node identifier identifies the first node;

means for obtaining, from each other node in the node group, a corresponding other coordinator node identifier representing a node in the node group determined by the corresponding other node to be the coordinator node; and wherein the means for generating the first global state comprises means for generating the first global state based on the first node state, each other node state obtained, the first coordinator node identifier, and each other coordinator node identifier obtained.

5. The system of claim 4 wherein the means for generating the first global state comprises means for generating a computed hash of the first node state, each other node state, the first coordinator node identifier, and each other coordinator node identifier.

6. The system of claim 4, further comprising:

means for maintaining a record of all active nodes in the node group; and means for periodically determining whether a communication has been received from each other node in the node group and removing from the record any node from which no communication has been received after a predetermined amount of time.

7. A method for coordinating services provided by multiple nodes in a node group, the method performed by a first node in the node group and comprising the steps of:

generating a first node state of the first node, the node state representing services currently performed by the first node;

providing the first node state to a second node in the node group;

obtaining, from the second node in the node group, a second node state representing services currently performed by the second node;

generating a first global state based on the first node state and the second node state;

obtaining, from the second node, a second global state generated by the second node;

comparing the first global state and the second global state; and performing coordinator node functions only when the first global state and the second global state are the same, the coordinator node functions comprising at least one of directing a node in the node group to perform a service and directing a node in the node group not to perform a service;

maintaining a first coordinator node identifier of the first node, the first coordinator node identifier representing a node in the node group determined by the first node to be a coordinator node:

wherein the step of performing coordinator node functions comprises performing coordinator node functions only when the first global state and the second global state are the same and only when the first coordinator node identifier identifies the first node;

obtaining, from a second node in the node group, a second coordinator node identifier representing a node in the node group determined by the second node to be the coordinator node; and wherein the step of generating the first global state comprises generating the first global state based on the first node state, the second node state, the first coordinator node identifier and the second coordinator node identifier.

8. The method of claim 7 wherein the step of generating the first global state comprises generating a computed hash of the first node state, the second node state, the first coordinator node identifier and the second coordinator node identifier.

9. The method of claim 7 wherein the first coordinator node identifier is determined by the first node to be the coordinator node based on a comparison to the second coordinator node identifier.

10. A computer system for coordinating services performed by multiple nodes, the system comprising:

a first server containing a first node, the first node comprising a first processor capable of performing one or more of the services, means for generating a first node state representing services currently performed by the first node, means for obtaining, from a second node, a second node state representing services currently performed by the second node, means for generating a first global state based on the generated first node state and the obtained second node state, means for obtaining, from the second node, a second global state generated by the second node, and first means for performing coordinator node functions only when the first global state generated by the first node is the same as the second global state obtained from the second node, the coordinator node functions comprising at least one of directing a node in the node group to perform a service and directing a node in the node group not to perform a service; and a second server containing the second node, the second node comprising a second processor capable of performing one or more of the services, means for generating the second node state, means for obtaining, from the first node, the first node state, means for generating the second global state, means for obtaining, from the first node, the first global state, and second means for performing the coordinator node functions only when the second global state generated by the second node is the same as the first global state obtained from the first node;

the first node further comprises means for generating a first coordinator node identifier representing a node in the node group determined by the first node to be a coordinator node;

the first means for performing coordinator node functions comprises means for performing coordinator node functions only when the first coordinator node identifier identifies the first node and only when the first global state generated by the first node is the same as the second global state obtained from the second node;

the second node further comprises means for generating a second coordinator node identifier representing a node in the node group determined by the second node to be the coordinator node;

the second means for performing coordinator node functions comprises means for performing coordinator node functions only when the second coordinator node identifier identifies the second node and only when the second global state generated by the second node is the same as the first global state obtained from the first node;

the first node further comprises means for obtaining, from the second node, the second coordinator node identifier;

the second node further comprises means for obtaining, from the first node, the first coordinator node identifier; and the means for generating the first global state comprises means for generating the first global state based on the first node state, the second node state, the first coordinator node identifier and the second coordinator node identifier.

11. The computer system of claim 10 wherein the means for generating the first global state comprises means for generating a computed hash of the first node state, the second node state, the first coordinator node identifier and the second coordinator node identifier.

12. The computer system of claim 10 wherein the means for generating the first coordinator node identifier comprises means for comparing a first node identifier of the first node to a second node identifier of the second node.

* * * * *